(12) United States Patent
Su et al.

(10) Patent No.: US 8,558,973 B2
(45) Date of Patent: Oct. 15, 2013

(54) LIQUID CRYSTAL MIXTURE AND LIQUID CRYSTAL DISPLAY PANEL

(75) Inventors: Chun-Wei Su, Taipei (TW); Jan-Tien Lien, Keelung (TW); Hui-Chen Lin, Taoyuan County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 200 days.

(21) Appl. No.: 13/183,934

(22) Filed: Jul. 15, 2011

(65) Prior Publication Data
US 2012/0257146 A1 Oct. 11, 2012

(30) Foreign Application Priority Data
Apr. 6, 2011 (TW) .............................. 100111773 A

(51) Int. Cl.
*G02F 1/1333* (2006.01)
(52) U.S. Cl.
USPC .......... 349/93; 349/135; 252/299.01; 428/1.1
(58) Field of Classification Search
USPC ............... 349/93, 86, 88, 123, 127, 106, 141, 349/135; 252/299.01, 299.6, 299.62, 252/299.63; 428/1.1, 424.4, 1.2; 427/520; 430/20
See application file for complete search history.

(56) References Cited

U.S. PATENT DOCUMENTS

| 6,221,443 | B1 * | 4/2001 | Kubota et al. ................... 428/1.1 |
| 6,733,958 | B2 * | 5/2004 | Fukuda et al. ................ 430/321 |
| 7,372,533 | B2 * | 5/2008 | Inoue et al. .................... 349/123 |
| 7,892,449 | B2 * | 2/2011 | Okabe et al. ............. 252/299.01 |
| 2010/0051194 | A1 | 3/2010 | Chien et al. |
| 2010/0124623 | A1 * | 5/2010 | Wu ................................ 428/1.1 |
| 2010/0296032 | A1 * | 11/2010 | Shin et al. ...................... 349/96 |
| 2012/0081652 | A1 * | 4/2012 | Su et al. ........................ 349/191 |

FOREIGN PATENT DOCUMENTS

| CN | 1927845 A | 3/2007 |
| CN | 101968589 A | 2/2011 |
| TW | 200949385 A | 12/2009 |
| TW | 201022331 | 6/2010 |

* cited by examiner

*Primary Examiner* — Thoi Duong
(74) *Attorney, Agent, or Firm* — Muncy, Geissler, Olds & Lowe, PLLC

(57) ABSTRACT

A liquid crystal display panel includes an active component array substrate, a color filter substrate, a pair of alignment films and a liquid crystal layer. The active component array substrate has a first plane. The color filter substrate has a second plane opposite to the first plane. The alignment films are disposed on the first plane and the second plane respectively. The liquid crystal layer is disposed between the alignment films and includes a liquid crystal material, a photo initiator and a first monomer material. The liquid crystal material, the photo initiator and the first monomer material are mixed together. When being irradiated by ultraviolet light, the photo initiator enables the first monomer material to react in a polymerization to form the alignment films.

12 Claims, 4 Drawing Sheets

LIQUID CRYSTAL MIXTURE AND LIQUID CRYSTAL DISPLAY PANEL

CROSS-REFERENCE TO RELATED APPLICATION

This application claims the benefit of Taiwan Patent Application No. 100111773, filed on Apr. 6, 2011, which is hereby incorporated by reference for all purposes as if fully set forth herein.

BACKGROUND OF THE INVENTION

1. Field of Invention

The present invention relates to an element of a display, and more particularly to a liquid crystal display (LCD) panel.

2. Related Art

The present LCD technology has developed an LCD employing a horizontal electric field to drive liquid crystal molecules, and the LCD is such as a fringe field switching (FFS) LCD or an in-plane switching (IPS) LCD. A direction of the horizontal electric field is substantially parallel to a plane of an active component array substrate and a color filter substrate.

The LCD, such as the fringe field switching LCD or the in-plane switching LCD), has a pair of alignment films, and the alignment films are located on the active component array substrate and the color filter substrate respectively. After the alignment films are formed, a felt cloth rubs against the surfaces of the alignment films generally, so as to enable the alignment films to have a function of aligning liquid crystal molecules.

However, the LCD employs a horizontal electric field to drive liquid crystal molecules, so the rubbing directions of the alignment films should be the same, that is, an angle between the rubbing directions of the two alignment films needs to be equal to or close to zero degrees. Otherwise, low screen brightness is easily caused. Therefore, many manufactories use a high-precision friction device to rub the alignment films, but the high-precision friction device is expensive, thereby increasing the manufacturing cost of the LCD.

SUMMARY OF THE INVENTION

The present invention is directed to an LCD panel, in which alignment films do not need to be rubbed with felt cloth, so that an expensive high-precision friction device can be omitted, thereby reducing the manufacturing cost of an LCD.

The present invention is directed to a liquid crystal mixture including a monomer material for forming alignment films.

The present invention also provides an LCD panel including an active component array substrate having a first plane, a color filter substrate having a second plane opposite to the second plane, a pair of alignment films, and a liquid crystal layer. The alignment films are disposed on the first plane and the second plane respectively. The liquid crystal layer is disposed between the alignment films and includes a liquid crystal material, a photo initiator and a first monomer material. The liquid crystal material, the photo initiator and the first monomer material are mixed together, and the photo initiator makes the first monomer material react in a polymerization to form the alignment films when an ultraviolet light irradiates the photo initiator.

The present invention also provides a liquid crystal mixture including a liquid crystal material, a photo initiator, and a first monomer material. The photo initiator is mixed with the liquid crystal material, and a weight percentage of the photo initiator in the liquid crystal mixture is higher than 0.1%. The first monomer material is mixed with the liquid crystal material, and a weight percentage of the first monomer material in the liquid crystal mixture is between 0.5% and 40%.

Based on the above description, the alignment films of the present invention have liquid crystal alignment functions without being rubbed by the photo initiator and at least one monomer material (for example, the first monomer material). Compared with the prior art, in the present invention, the high-precision friction device can be omitted in the manufacturing of the LCD panel, thereby reducing the manufacturing cost of the LCD.

In order to make the features and advantages of the present invention clearer and more comprehensible, the present invention is described in detail below with reference to embodiments and the accompanying drawings.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1A:
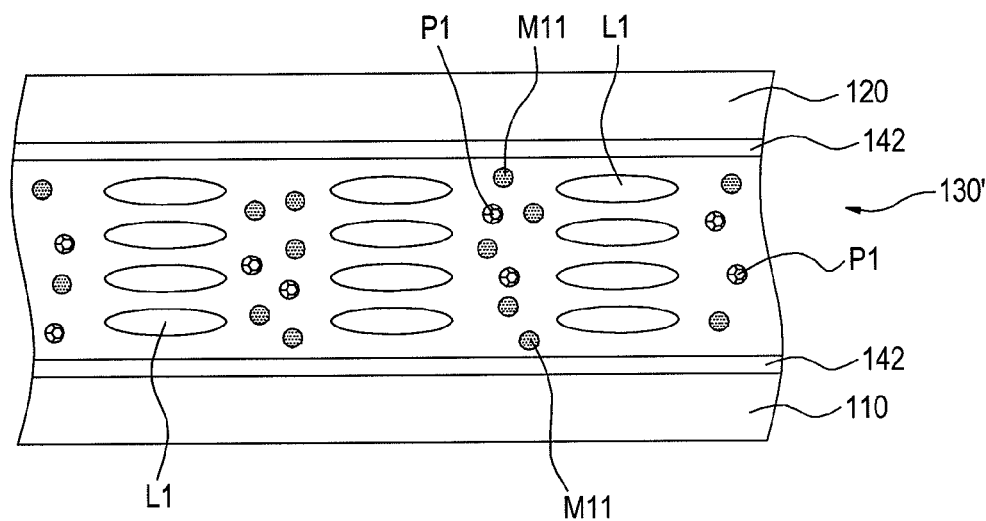
FIG. 1A to FIG. 1C are schematic views of a manufacturing process of an LCD panel according to the first embodiment of the present invention.
Figure 1B:
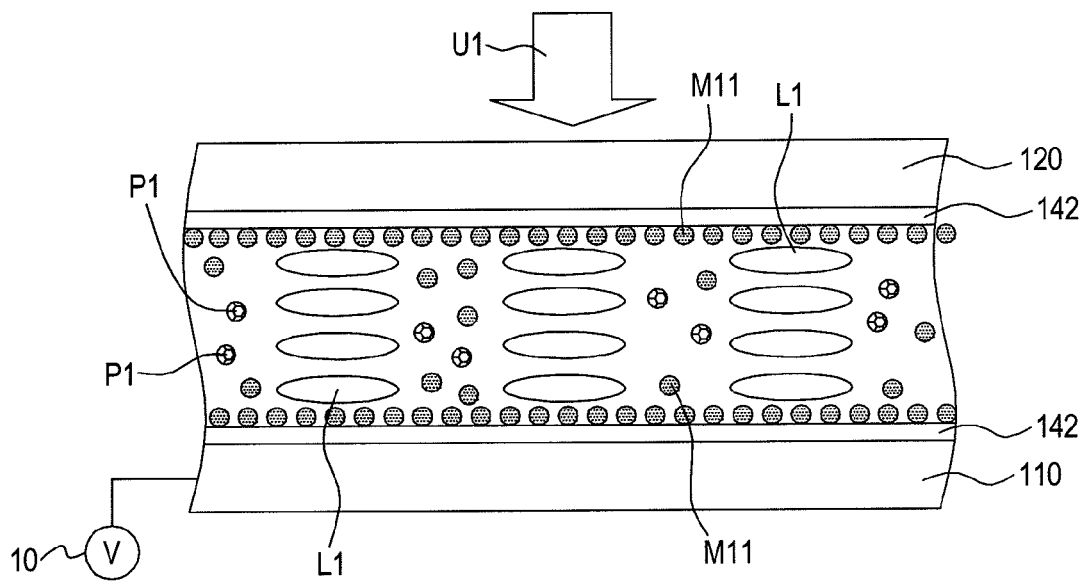
Figure 1C:
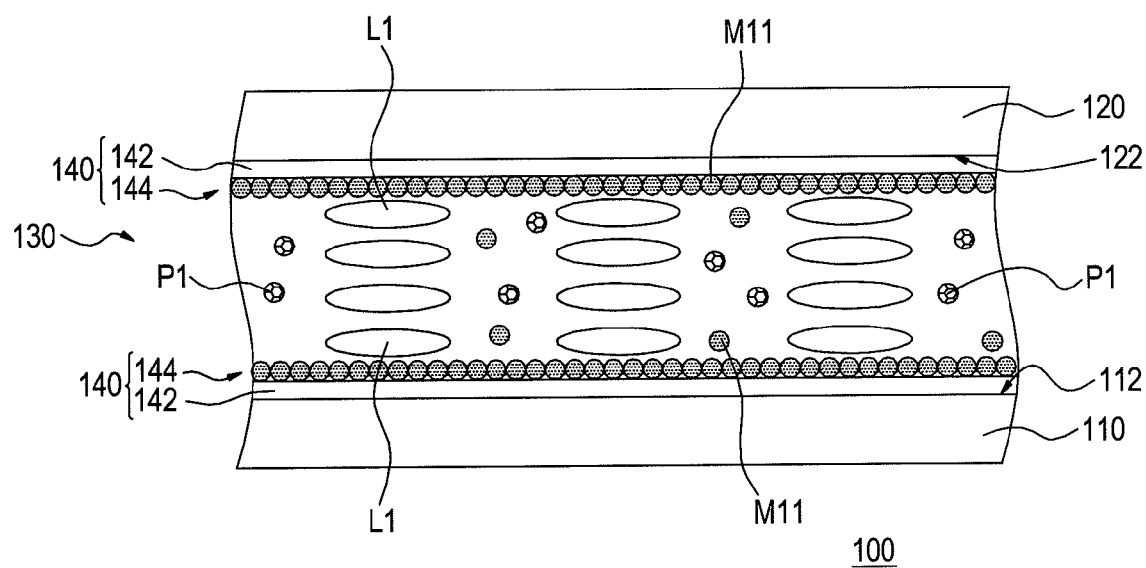

FIG. 1A to FIG. 1C are schematic views of a manufacturing process of an LCD panel according to the first embodiment of the present invention. FIG. 1A to FIG. 1C disclose a liquid crystal alignment process, and FIG. 1C shows the LCD panel after the liquid crystal alignment process is completed. Referring FIG. 1C, a structure of an LCD panel 100 of this embodiment is described below at first.

The LCD panel 100 includes an active component array substrate 110, a color filter substrate 120, a liquid crystal layer 130 and a pair of alignment films 140. The alignment films 140 and the liquid crystal layer 130 are both disposed between the active component array substrate 110 and the color filter substrate 120, and the liquid crystal layer 130 is disposed between the alignment films 140 and contacts the alignment films 140. The active component array substrate 110 has a first plane 112, and the color filter substrate 120 has a second plane 122. The first plane 112 is opposite to the second plane 122, and the alignment films 140 are disposed on the first plane 112 and the second plane 122 respectively.

The LCD panel 100 can be applied to a fringe field switching LCD or an in-plane switching LCD, so the active component array substrate 110 can generate a horizontal electric field, that is, an electric field in a direction parallel to the first plane 112. Moreover, the active component array substrate 110 has a plurality of pixel electrodes (not shown), and the color filter substrate 120 may not have any common electrodes capable of causing a capacitive coupling effect with the pixel electrodes.

The liquid crystal layer 130 includes a liquid crystal material, a photo initiator and a first monomer material. The liquid crystal material, the photo initiator and the first monomer material are mixed together. The liquid crystal material, the photo initiator and the first monomer material include a plurality of liquid crystal molecules L1, a plurality of photo initiator molecules P1 and a plurality of first monomer molecules M11, respectively. Moreover, the first monomer material may be an ester material.

In this embodiment, the major component of the liquid crystal material may be the liquid crystal molecules L1, the major component of the photo initiator may be the photo initiator molecules P1, and the major component of the first monomer material may be the first monomer molecules M11. Therefore, the liquid crystal material may substantially consist of the liquid crystal molecules L1, the photo initiator may substantially consist of the photo initiator molecules P1, and the first monomer material substantially may consist of the first monomer molecules M11.

Based on the above description, a person of ordinary skill in the art can understand that, as shown in FIG. 1A to FIG. 1C, the liquid crystal molecules L1 can represent the liquid crystal material, the photo initiator molecules P1 can represent the photo initiator, and the first monomer molecules M11 can represent the first monomer material. Therefore, even though the liquid crystal material, the photo initiator and the first monomer material are not additionally marked with element symbols, a person of ordinary skill in the art can still know from FIG. 1A to FIG. 1C that the liquid crystal layer 130 includes the liquid crystal material, the photo initiator and the first monomer material.

Each alignment film 140 may be a film with a multi-layered structure. In this embodiment, each alignment film 140 may include a first polymer layer 142 and a second polymer layer 144. Each second polymer layer 144 is located between one of the first polymer layers 142 and the liquid crystal layer 130, and the second polymer layers 144 contact the liquid crystal layer 130. Thus, it can be known that, the liquid crystal layer 130 is located between the second polymer layers 144.

The structure of the LCD panel 100 is mainly described above. The manufacturing process of the LCD panel 100 is described below with reference to FIG. 1A to FIG. 1C.

Referring to FIG. 1A, in the manufacturing process of the LCD panel 100, first, a liquid crystal mixture 130' is injected and sealed between the active component array substrate 110 and the color filter substrate 120. After injecting and sealing the liquid crystal mixture 130', the liquid crystal mixture 130' is located between the first polymer layers 142.

The liquid crystal mixture 130' includes the liquid crystal material, the photo initiator and the first monomer material. The photo initiator and the first monomer material are both mixed with the liquid crystal material, so the liquid crystal mixture 130' includes a plurality of liquid crystal molecules L1, a plurality of photo initiator molecules P1 and a plurality of first monomer molecules M11. Moreover, a weight percentage of the photo initiator in the liquid crystal mixture 130' is higher than 0.1%, for example, between 0.1% and 1%. A weight percentage of the first monomer material in the liquid crystal mixture 130' is between 0.5% and 40%.

Referring to FIG. 1B, next, a voltage 10 is applied to the active component array substrate 110, so that the active component array substrate 110 generates a horizontal electric field for driving the liquid crystal molecules L1, and a magnitude of the voltage 10 is controlled to adjust the arrangement and the inclined angle of the liquid crystal molecules L1, so as to obtain the maximum of light transmittance of the active component array substrate 110.

Referring to FIG. 1B and FIG. 1C, then, the voltage 10 is kept applying, and an ultraviolet (UV) light U1 irradiates the photo initiator, so that the photo initiator reacts with the first monomer material. The wavelength of the ultraviolet light (UV) light U1 may be between 254 nanometers (nm) and 365 nm. When the UV light U1 irradiates the photo initiator, the photo initiator enables the first monomer material to react in a polymerization to form the alignment films 140.

A functionality of the first monomer material may be higher than 2. The functionality means the number of bonds formed by a monomer molecule (for example, the first monomer molecules M11) during the polymerization. The functionality also means the number of molecules connected to a monomer molecule during the polymerization.

Each first monomer molecule M11 has a plurality of unsaturated bonds, for example, double bonds or triple bonds. The first monomer material may be triethylene glycol diacrylate (TEGDA), which has a chemical structure of Formula (1) as shown below:

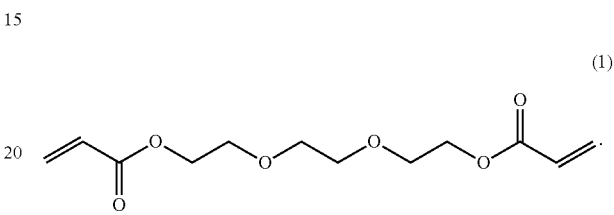

(1)

It can be seen from Formula (1) that, the TEGDA molecule (that is, the first monomer molecule M11) has a double bond at two sides thereof. When the UV light U1 irradiates the photo initiator, the photo initiator can break the double bonds of the first monomer molecules M11 to form free radicals. Moreover, the liquid crystal molecule L1 and the molecule forming the first polymer layer 142 both have a side chain, and the material of the first polymer layer 142 is, for example, polyimide (PI).

When the photo initiator breaks the double bond of the first monomer molecule M11 to form the free radicals, two ends of the first monomer molecule M11 are connected to the side chains of the liquid crystal molecule L1 and the first polymer layer 142 respectively, so that the first monomer molecule M11 is connected to the liquid crystal molecule L1 and the first polymer layer 142. Then, during the irradiation of the UV light U1, the first monomer molecules M11 also react in the polymerization at the same time, so as to form the second polymer layer 144 on the first polymer layer 142.

It can be known from this that a material of the alignment film 140 may include the first monomer material, and the second polymer layer 144 is formed of the plurality of first monomer molecules M11 reacting in a polymerization. After the second polymer layer 144 is formed, the application of the voltage 10 will be stopped. The LCD panel 100 is substantially formed so far.

The first monomer molecule M11 is connected to the liquid crystal molecule L1 and the first polymer layer 142, so the liquid crystal molecule L1 can be fixed on the second polymer layer 144 of the alignment film 140 through the first monomer molecule M11. In this way, when the voltage 10 is not applied to the active component array substrate 110, the alignment films 140 can maintain both the arrangement and the inclined angle of the liquid crystal molecules L1 when the maximum of light transmittance of the active component array substrate 110 is obtained, so as to align the liquid crystal molecules L1.

It is noted that, in this embodiment, the first monomer material may be TEGDA, and the TEGDA has a carbon chain of 12 carbon atoms, so the first monomer molecule M11 has a strong chain property. Therefore, the duration of the irradiation of the UV light U1 to the photo initiator is not necessary to be long, and the second polymer layer 144 can be formed.

The strong chain property of the first monomer molecule M11 can enhance an alignment force from second polymer layer 144 aligning the liquid crystal molecules L1, so as to effectively maintain the arrangement and the inclined angle of the liquid crystal molecules L1. Moreover, the stronger the chain property of the first monomer molecule M11 is, the lower the weight percentage of the first monomer material in the liquid crystal mixture 130' is, and the lower the demand for the first monomer material of the liquid crystal mixture 130' is.

However, it is noted that, in other embodiments, the carbon chain of the first monomer molecule M11 may include less than 12 carbon atoms, so the first monomer molecule M11 can also have a weak chain property. When the first monomer molecule M11 has a weak chain property, the duration of the irradiation of the UV light U1 to the photo initiator needs to be long to form the second polymer layer 144. Moreover, the weaker the weak chain property of the first monomer molecule M11 is, the higher the weight percentage of the first monomer material in the liquid crystal mixture 130' is, and the higher the demand for the first monomer material of liquid crystal mixture 130' is.

Figure 2A:
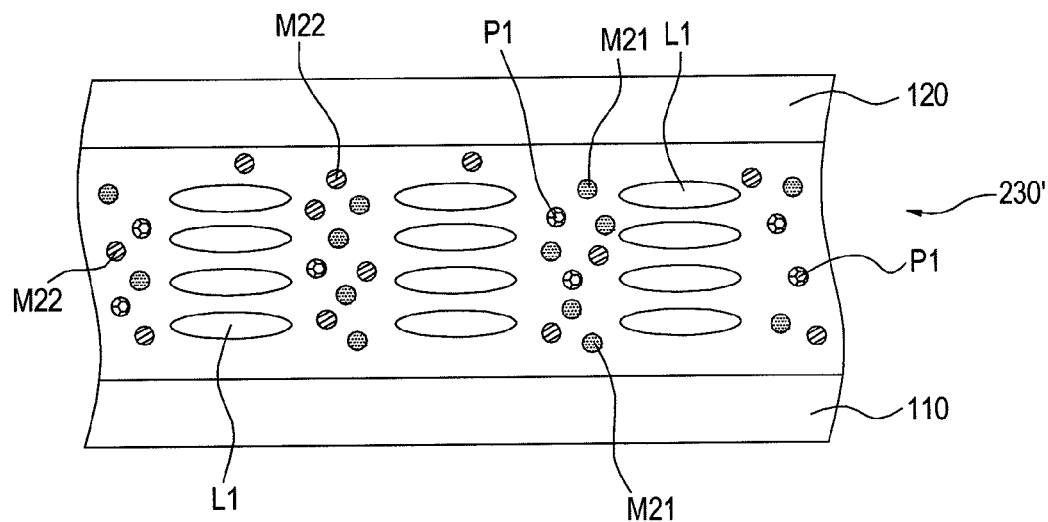
FIG. 2A to FIG. 2D are schematic views of a manufacturing process of an LCD panel according to the second embodiment of the present invention.
Figure 2B:
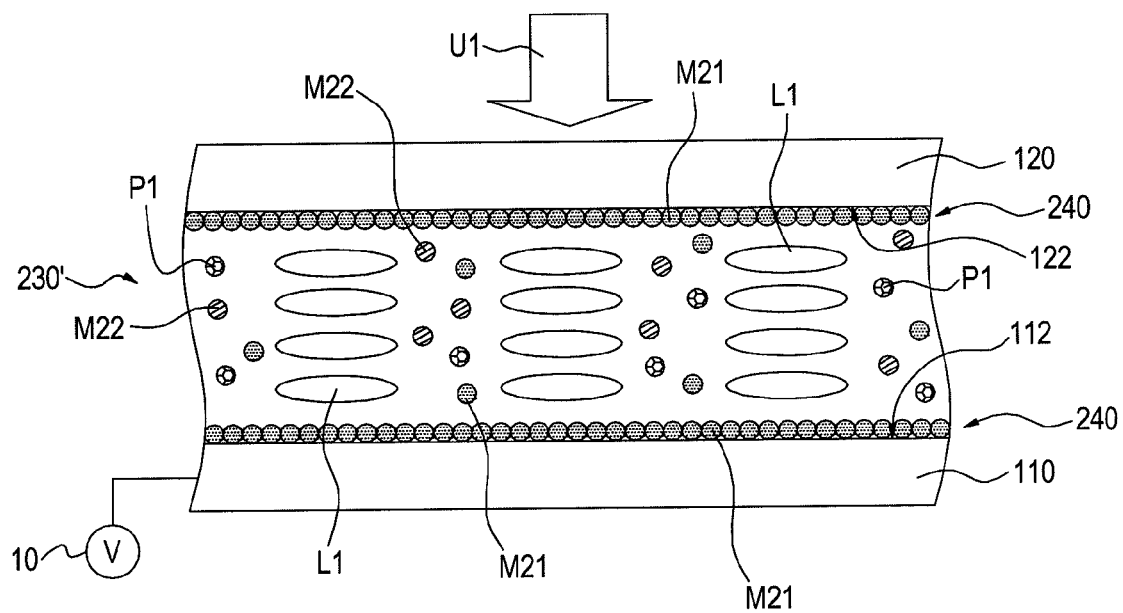
Figure 2C:
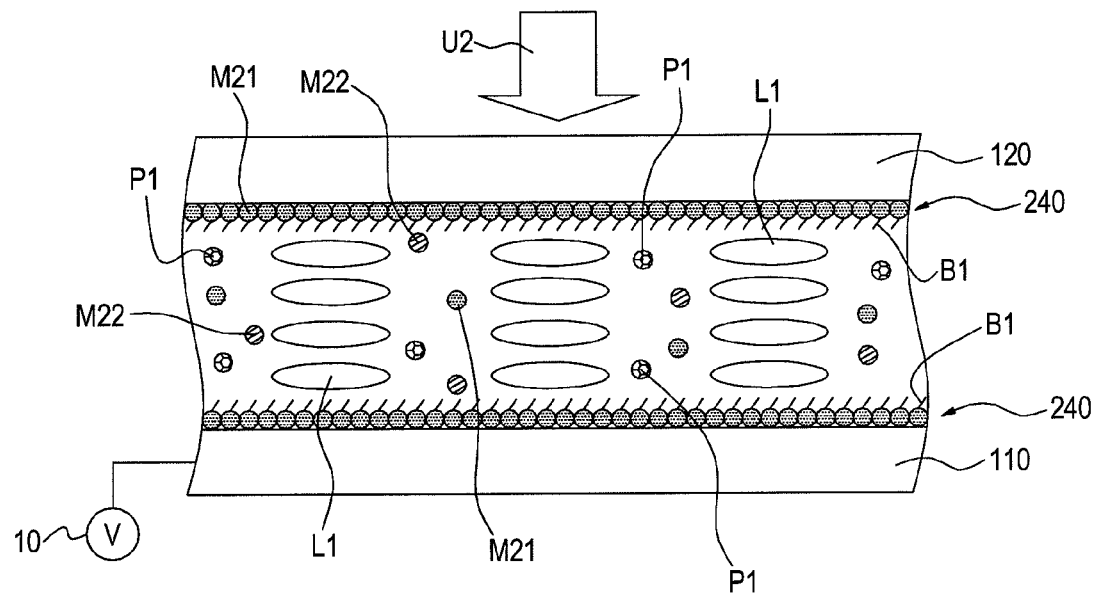
Figure 2D:
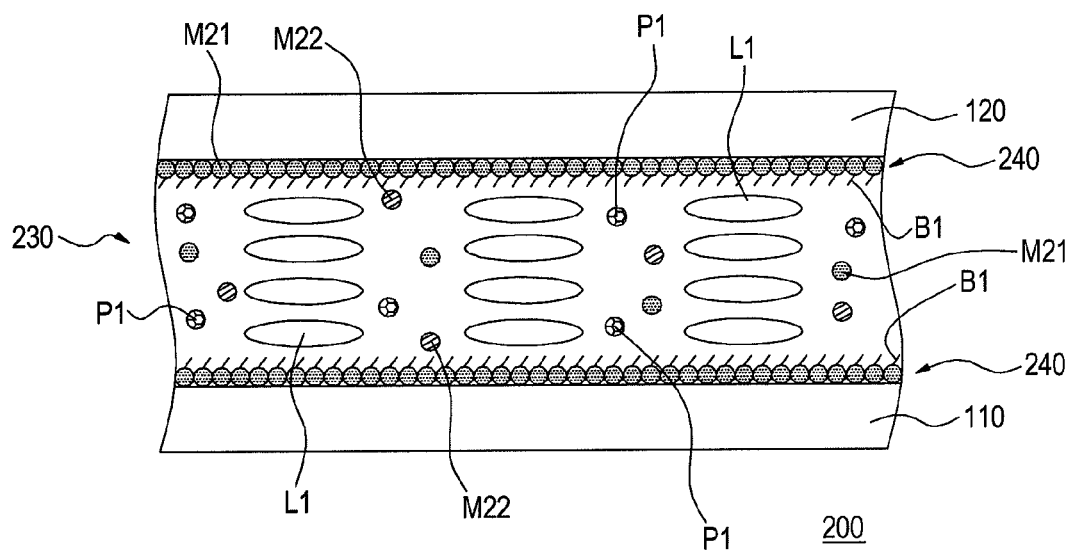

FIG. 2A to FIG. 2D are schematic views of a manufacturing process of an LCD panel according to the second embodiment of the present invention. FIG. 2A to FIG. 2D disclose a liquid crystal alignment process, and FIG. 2D shows the LCD panel after the liquid crystal alignment process is completed. Referring FIG. 2D, a structure of an LCD panel 200 of this embodiment is described below at first.

The LCD panel 200 of the second embodiment includes an active component array substrate 110, a color filter substrate 120, a liquid crystal layer 230 and a pair of alignment films 240. The structure of the LCD panel 200 is similar to that of the LCD panel 100. For example, the relevant positions of the active component array substrate 110, the color filter substrate 120, the liquid crystal layer 230 and the alignment films 240 are the same as those in the first embodiment, so the details hereinafter are not described again. However, the structures and materials of the liquid crystal layer 230 and the alignment films 240 are different from those in the first embodiment.

Different from the first embodiment, the liquid crystal layer 230 includes two monomer materials. In particular, the liquid crystal layer 230 includes a liquid crystal material, a first monomer material, a second monomer material and a photo initiator. The first monomer material, the second monomer material and the photo initiator are mixed with the liquid crystal material, and the liquid crystal material, the first monomer material, the second monomer material and the photo initiator include a plurality of liquid crystal molecules L1, a plurality of photo initiator molecules P1, a plurality of first monomer molecules M21 and a plurality of second monomer molecules M22, respectively.

In the second embodiment, the major component of the liquid crystal material may be the liquid crystal molecules L1, the major component of the photo initiator may be the photo initiator molecules P1, the major component of the first monomer material may be the first monomer molecules M21, and the major component of the second monomer material may be the second monomer molecules M22. Therefore, the liquid crystal material may substantially consist of the liquid crystal molecules L1, the photo initiator may substantially consist of the photo initiator molecules P1, the first monomer material may substantially consist of the first monomer molecules M21, and the second monomer material may substantially consist of second monomer molecule M22.

Based on the above description, a person of ordinary skill in the art can understand that, as shown in FIG. 2A to FIG. 2D, the liquid crystal molecules L1 can represent the liquid crystal material, the photo initiator molecules P1 can represent the photo initiator, the first monomer molecules M21 can represent the first monomer material, and the second monomer molecule M22 can represent the second monomer material. Therefore, even though the liquid crystal material, the photo initiator, the first monomer material and the second monomer material are not additionally marked with element symbols, a person of ordinary skill in the art can still know from FIG. 2A to FIG. 2D that the liquid crystal layer 230 includes the liquid crystal material, the photo initiator, the first monomer material and the second monomer material.

The alignment film 240 is substantially a film of a single-layered structure, and the material of the alignment film 240 includes the first monomer material. The alignment film 240 may formed of the plurality of first monomer molecules M21 reacting in a polymerization. A plurality of bonds B1 are formed on each alignment film 240, and the bonds B1 can fix a plurality of liquid crystal molecules L1 on the alignment film 240. Moreover, different from the first monomer material in the first embodiment, the first monomer material in this embodiment may be an acrylic acid material, rather than polyimide.

The structure of the LCD panel 200 is mainly described above. The manufacturing process of the LCD panel 200 is described below with reference to FIG. 2A to FIG. 2D.

Referring to FIG. 2A, in the manufacturing process of the LCD panel 200, first, a liquid crystal mixture 230' is injected and sealed between the active component array substrate 110 and the color filter substrate 120. The liquid crystal mixture 230' includes the liquid crystal material, the photo initiator, the first monomer material and the second monomer material. The photo initiator, the first monomer material and the second monomer material are mixed with the liquid crystal material, so the liquid crystal mixture 230' includes the plurality of liquid crystal molecules L1, the plurality of photo initiator molecules P1, the plurality of first monomer molecules M21 and the plurality of second monomer molecules M22.

Furthermore, a weight percentage of the photo initiator in the liquid crystal mixture 230' is between 0.1% and 2%, a weight percentage of the first monomer material in the liquid crystal mixture 230' is between 10% and 40%, and a weight percentage of the second monomer material in the liquid crystal mixture 230' is between 5% and 20%.

Referring to FIG. 2B, next, a voltage 10 is applied to the active component array substrate 110, so that the active component array substrate 110 generates a horizontal electric field for driving the liquid crystal molecules L1, and a magnitude of the voltage 10 is controlled to adjust both the arrangement and the inclined angle of the liquid crystal molecules L1, so as to obtain the maximum of light transmittance of the active component array substrate 110.

Then, the voltage 10 is kept on applying, and the UV light U1 irradiates the photo initiator, so that the photo initiator and the first monomer material react in a chemical reaction. When the UV light U1 irradiates the photo initiator, the photo initiator enables the first monomer material to react in a polymerization to form the alignment films 240.

Each first monomer molecule M21 has a plurality of unsaturated bonds, for example, double bonds or triple bonds, and the first monomer material may be an acrylic acid material. When the first monomer material is an acrylic acid material, the first monomer molecules M21 react in a polymerization during the UV light U1 irradiates the photo initiator, so as to form the alignment films 240 on both the first plane 112 of the active component array substrate 110 and the second plane 122 of the color filter substrate 120. Moreover, the alignment film 240 can be attached on both the first plane 112 and the second plane 122 by the hydrophile of the first monomer material.

Referring to FIG. 2C and FIG. 2D, next, the voltage 10 is kept on applying, and the UV light U2 irradiates the photo initiator. The UV light U2 may be the same as the UV light U1, so the UV light U1 and the UV light U2 both can come from the same laser source, and the wavelength of the UV light U2 may also be between 254 nm and 365 nm. In other words, the steps of irradiating the UV light U1 and the UV light U2 as shown in FIG. 2C and FIG. 2D can be regarded as a step of irradiating the photo initiator twice with the same laser source.

However, in other embodiment, the UV light U2 may be different from the UV light U1, that is, the wavelength of the UV light U2 is different from that of the UV light U1. In particular, the photo initiator may not only include one kind of the photo initiator molecules P1, but also include other kind of the photo initiator molecules. Therefore, the photo initiator can substantially absorb the UV light U1 and U2 with different wavelengths, so the UV light U1 and U2 are not necessarily the same.

Each first monomer molecule M21 has a plurality of links, and each second monomer molecule M22 has a plurality of side chains. The second monomer material may be a composition containing an acid anhydride material and an aromatic ring, and the molecule (that is, the second monomer molecule M22) has a chemical structure as shown Formula (2) below:

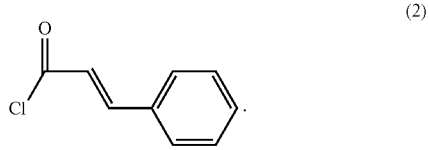 [SMILES: O=C(Cl)/C=C/c1ccccc1]

(2)

When the UV light U1 irradiates the photo initiator, the photo initiator enables to connect a link of the first monomer molecule M11 to the side chain of the second monomer molecule M22, and enables the second monomer molecule M22 to form a plurality of bonds B1 on the alignment films 240. A plurality of side chains of the liquid crystal molecules L1 are connected to the bonds B1, so that the liquid crystal molecules L1 can be fixed on the alignment films 240.

Thus, it can be known form that, the second monomer material enables to fix the liquid crystal molecules L1 on the alignment films 240, and the alignment film 240 is formed of a plurality of first monomer molecules M21 reacting in a polymerization. After the bonds B1 are formed, application of the voltage 10 will be stopped. The LCD panel 200 is substantially formed so far.

Based on the above description, a plurality of liquid crystal molecules L1 can be fixed on the alignment films 240 through the bonds B1. In this way, when the voltage 10 is not applied to the active component array substrate 110, the alignment films 240 can maintain both the arrangement and the inclined angles of the liquid crystal molecules L1 when the maximum of light transmittance of the active component array substrate 110 is obtained, so as to align the liquid crystal molecules L1.

It is noted that the first monomer molecule M21 may have a strong chain property or a weak chain property in the second embodiment. When the first monomer molecule M21 has the strong chain property, the duration of irradiation of the UV light U1 to the photo initiator does not need to be long to form the alignment films 240. Moreover, the stronger the strong chain property of the first monomer molecule M21 is, the lower the weight percentage of the first monomer material in the liquid crystal mixture 230' is, and the lower the demand for the first monomer material of the liquid crystal mixture 230' is.

In contrast, when the first monomer molecule M21 has a weak chain property, the duration of the irradiation of the UV light U1 to the photo initiator needs to be long to form the alignment films 240. The weaker the weak chain property of the first monomer molecule M21 is, the higher the weight percentage of the first monomer material in the liquid crystal mixture 230' is, and the higher the demand for the first monomer material of the liquid crystal mixture 230' is.

Similarly, the second monomer molecule M22 may also have the strong chain property or the weak chain property. When the second monomer molecule M22 has the strong chain property, the duration of the irradiation of the UV light U2 to the photo initiator does not need to be long to form the bonds B1. The strong chain property of the second monomer molecule M22 can enhance an alignment force from the bonds B1 aligning the liquid crystal molecule L1, so as to effectively maintain both the arrangement and the inclined angle of the liquid crystal molecules L1. Moreover, the stronger the strong chain property of the second monomer molecule M22 is, the lower the weight percentage of the second monomer material in the liquid crystal mixture 230' is, and the lower the demand for the second monomer material of the liquid crystal mixture 230' is.

In contrast, when the second monomer molecule M22 has the weak chain property, the duration of the irradiation of the UV light U2 to the photo initiator needs to be long to form the bonds B1. The weaker the weak chain property of the second monomer molecule M22 is, the higher the weight percentage of the second monomer material in the liquid crystal mixture 230' is, and the higher the demand for the second monomer material of the liquid crystal mixture 230' is.

To sum up, the present invention uses the photo initiator and at least one monomer material (for example, the first monomer material) in combination with the irradiation of the UV light and the application of the voltage to form the alignment films with the liquid crystal alignment function on the active component array substrate and the color filter substrate. Compared with the prior art, according to the present invention, the liquid crystal alignment process can be completed without a step of rubbing the alignment films, so that the high-precision friction device can be omitted in the manufacturing of the LCD panel, thereby reducing the manufacturing cost of the LCD.

The technical content of the present invention has been disclosed through preferred embodiments, but is not intended to be limited thereto. Various variations and modifications made by a person skilled in the art without departing from the spirit of the present invention fall within the protection scope of the present invention.

What is claimed is:
1. An LCD panel, comprising:
an active component array substrate, having a first plane;
a color filter substrate, having a second plane, wherein the first plane is opposite to the second plane;
a pair of alignment films, disposed on the first plane and the second plane respectively;
a liquid crystal layer, disposed between the alignment films and comprising a liquid crystal material, a photo initiator and a first monomer material, wherein the liquid crystal material, the photo initiator and the first monomer mate- rial are mixed together, and the photo initiator makes the first monomer material react in a polymerization to form the alignment films when an ultraviolet light irradiates the photo initiator; and a second monomer material, wherein the second monomer material is mixed with the liquid crystal material, the liquid crystal material comprises a plurality of liquid crystal molecules, and the second monomer material is used for fixing the liquid crystal molecules on the alignment films;

wherein the first monomer material is an acrylic acid material, and the second monomer material is a composition containing an acid anhydride material and an aromatic ring.

2. The LCD panel according to claim 1, wherein a functionality of the first monomer material is higher than 2.

3. The LCD panel according to claim 1, wherein the first monomer material is an ester material.

4. The LCD panel according to claim 1, wherein the first monomer material is triethylene glycol diacrylate.

5. The LCD panel according to claim 1, wherein each of the alignment films comprises a first polymer layer and a second polymer layer, each of the second polymer layers is located between one of the first polymer layers and the liquid crystal layer, and the second polymer layers contact the liquid crystal layer and are formed through the polymerization.

6. The LCD panel according to claim 1, wherein a wavelength of the UV light is between 254 nm and 365 nm.

7. A liquid crystal mixture, comprising:

a liquid crystal material;

a photo initiator, mixed with the liquid crystal material, wherein a weight percentage of the photo initiator in the liquid crystal mixture is higher than 0.1%;

a first monomer material, mixed with the liquid crystal material, wherein a weight percentage of the first monomer material in the liquid crystal mixture is between 0.5% and 40%; and a second monomer material, wherein the second monomer material is mixed with the liquid crystal material, and a weight percentage of the second monomer material in the liquid crystal mixture is between 5% and 20%;

wherein the first monomer material is an acrylic acid material, and the second monomer material is a composition containing an acid anhydride material and an aromatic ring.

8. The liquid crystal mixture according to claim 7, wherein the weight percentage of the photo initiator in the liquid crystal mixture is between 0.1% and 1%.

9. The liquid crystal mixture according to claim 7, wherein a functionality of the first monomer material is higher than 2.

10. The liquid crystal mixture according to claim 7, wherein the first monomer material is an ester material.

11. The liquid crystal mixture according to claim 7, wherein the first monomer material is triethylene glycol diacrylate (TEGDA).

12. The liquid crystal mixture according to claim 7, wherein the weight percentage of the first monomer material in the liquid crystal mixture is between 10% and 40%, and the weight percentage of the photo initiator in the liquid crystal mixture is between 0.1% and 2%.

* * * * *